United States Patent
Kamata

(10) Patent No.: US 6,798,983 B2
(45) Date of Patent: Sep. 28, 2004

(54) SHUTTER DEVICE OF LENS-FITTED PHOTO FILM UNIT

(75) Inventor: Kazuo Kamata, Minami-Ashigara (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/351,990

(22) Filed: Jan. 28, 2003

(65) Prior Publication Data

US 2003/0152378 A1 Aug. 14, 2003

(30) Foreign Application Priority Data

Feb. 13, 2002 (JP) ........................................ 2002-035955

(51) Int. Cl.[7] ........................ G03B 17/02; G03B 15/03; G03B 9/08; G03B 17/38
(52) U.S. Cl. ......................... 396/6; 396/179; 396/453; 396/502
(58) Field of Search .............................. 346/6, 89, 155, 346/169, 179, 183, 145, 235, 246, 247, 444, 452, 453, 458, 505, 502

(56) References Cited

U.S. PATENT DOCUMENTS 2,498,279 A * 2/1950 Kaplowitz .................. 396/475
3,638,544 A * 2/1972 Kitai ........................... 396/238
3,696,727 A * 10/1972 Yokozato ..................... 396/263
3,994,007 A * 11/1976 Uchiyama et al. ............. 396/65
4,687,314 A * 8/1987 Raschke ...................... 396/132

* cited by examiner

Primary Examiner—Alan A. Mathews
Assistant Examiner—Rochelle Blackman
(74) Attorney, Agent, or Firm—Young & Thompson

(57) ABSTRACT

A shutter device has a shutter drive lever striking a shutter blade to expose an exposure opening, a mooring lever, a cam, and a speed governor. The speed governor includes an escapement wheel with integrally formed two gear wheels, an anchor, and a movable mounting board on which the escapement wheel and anchor are mounted. One of the gear wheels of the escapement wheel is engaged with a claw of the anchor to slow down a rotational speed of the escapement wheel. The other gear wheel is engaged with a shutter speed adjustment gear formed in a periphery of the shutter drive lever. The shutter drive lever rotates at the same rotational speed as the escapement wheel, so that exposure time becomes long. When flash charge is turned off, the mounting board moves to an evacuation position in which the escapement wheel is disengaged with the shutter speed adjustment gear.

8 Claims, 8 Drawing Sheets

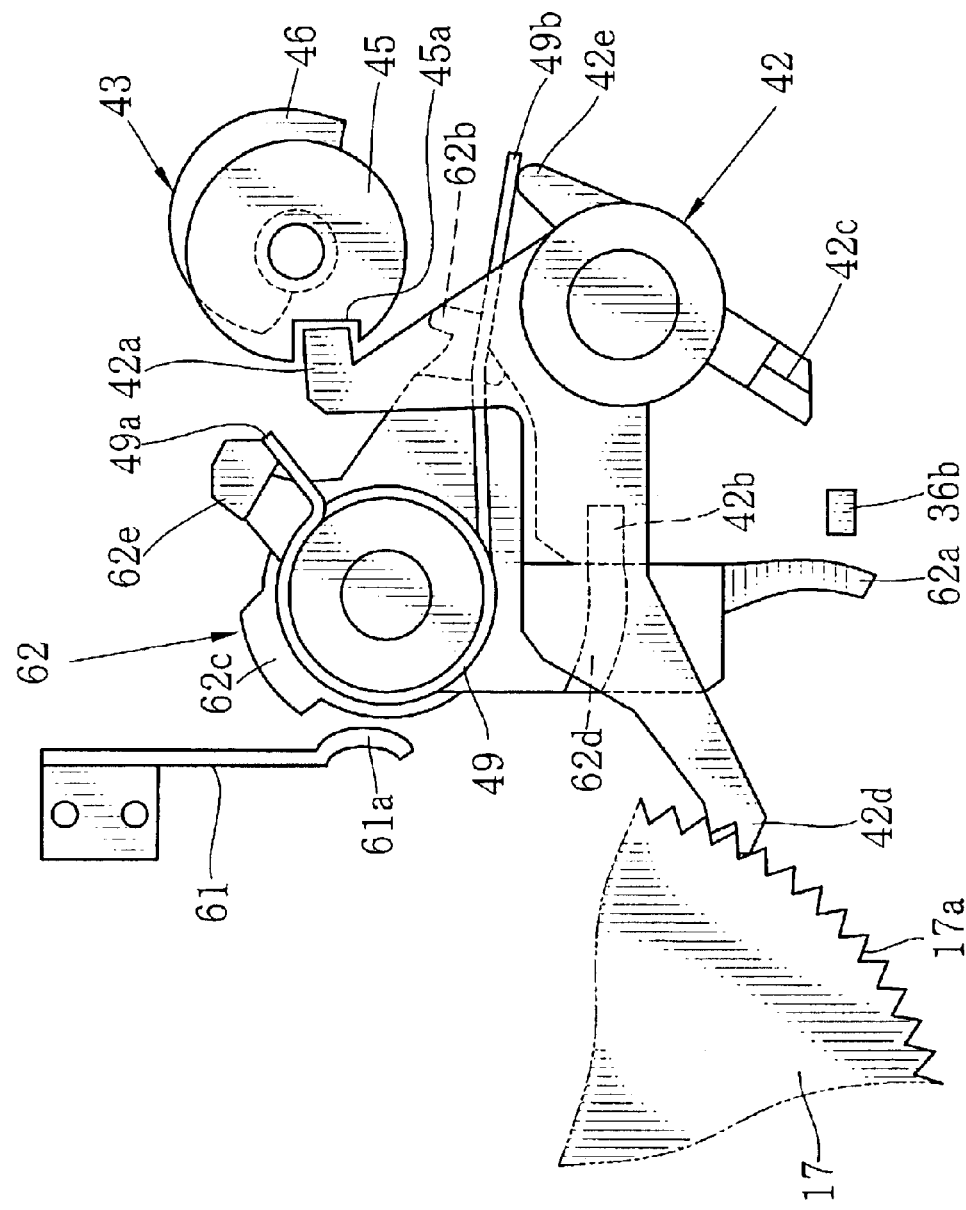

SHUTTER DEVICE OF LENS-FITTED PHOTO FILM UNIT

BACKGROUND OF THE INVENTION

1. Field of the Invention

The present invention relates to a shutter device of a lens-fitted photo film unit which has a shutter blade openably covering an exposure opening and a shutter drive lever striking the shutter blade against a bias of a spring.

2. Background Arts

A lens-fitted photo film unit, hereinafter called film unit, is premised on making exposures of only a single photo filmstrip, so that the film unit is designed as simple as possible in order to reduce its manufacturing costs. For example, the film unit adopts a so-called strike-type shutter device. The strike-type shutter device comprises a shutter drive lever movable in cooperation with shutter release operation, and a shutter blade covering an exposure opening. The shutter drive lever strikes an end of the shutter blade and opens the exposure opening while moving from a charge position to a release completion position. While the exposure opening is opened, a photo film is exposed to light from a subject. This strike-type shutter device is so designed as to have a fixed shutter speed within a range from $\frac{1}{150}$th to $\frac{1}{100}$th second for the sake of stable operation.

The shutter device, however, is not suited for low-light photography. When photographing a low-light subject like a night view, the shutter device causes under-exposed photography because the shutter speed is too fast for the low-light photography. Slowing down the shutter speed is effective in eliminating the disadvantage, but it is difficult to actualize the slow shutter speed with a simple shutter structure. It is possible to slow down the shutter speed with adopting a technology used in general cameras. In such a case, however, another problem, that is, increase in the manufacturing costs occurs.

SUMMARY OF THE INVENTION

An object of the present invention is to provide a shutter device of a lens-fitted photo film unit which realizes a slow shutter speed with a simple structure and at low cost.

To achieve the above object, a shutter device according to the present invention comprises a shutter drive lever which strikes a shutter blade against a bias of a spring, and a speed governor which acts on the shutter drive lever to slow down the shutter speed. The shutter drive lever has a shutter speed adjustment portion, and the speed governor has a speed-governing member. An exposure opening is held fully open in a predetermined time because the shutter speed adjustment portion and the speed-governing member make contact with each other. The speed governor is movable between a first position in which the speed-governing member contacts with the shutter speed adjustment portion to slow down the shutter speed, and a second position in which the speed-governing member does not contact with the shutter speed adjustment member. The shutter drive lever is rotatable around a fixed pivot. So, the speed governor realizes the slow shutter speed by means of slowing down a rotational speed of the shutter drive lever.

In the first embodiment, the shutter speed adjustment portion is a shutter speed adjustment gear formed in a periphery of the shutter drive lever. The speed governor comprises an escapement wheel with integrally formed two gear wheels, a swingable anchor with two claws, and a mounting board on which the escapement wheel and the anchor are mounted. The claw of the anchor is engaged with one of the two gear wheels to slow down a rotational speed of the escapement wheel. The speed governor is movable between the first position and the second position in accordance with movement of the mounting board. When the speed governor is in the first position, the other gear wheel is engaged with the shutter speed adjustment gear, so that the rotational speed of the shutter drive lever becomes slow.

In the second embodiment, the shutter speed adjustment member is a ledge formed in a periphery of the shutter drive lever. The speed governor has a leaf spring. The rotational speed of the shutter drive lever becomes slow because an end of the leaf spring makes contact with the ledge.

BRIEF DESCRIPTION OF THE DRAWINGS

The above object and advantages of the present invention will become apparent from the following detailed descriptions of the preferred embodiments when read in association with the accompanying drawings, which are given by way of illustration only and thus are not limiting the present invention. In the drawings, same reference numerals designate like or corresponding parts throughout the several views, and wherein:

FIG. 8 is a plan view of the shutter device with another type of speed governor according to a second embodiment.

DETAILED DESCRIPTION OF THE EMBODIMENTS

Figure 1:
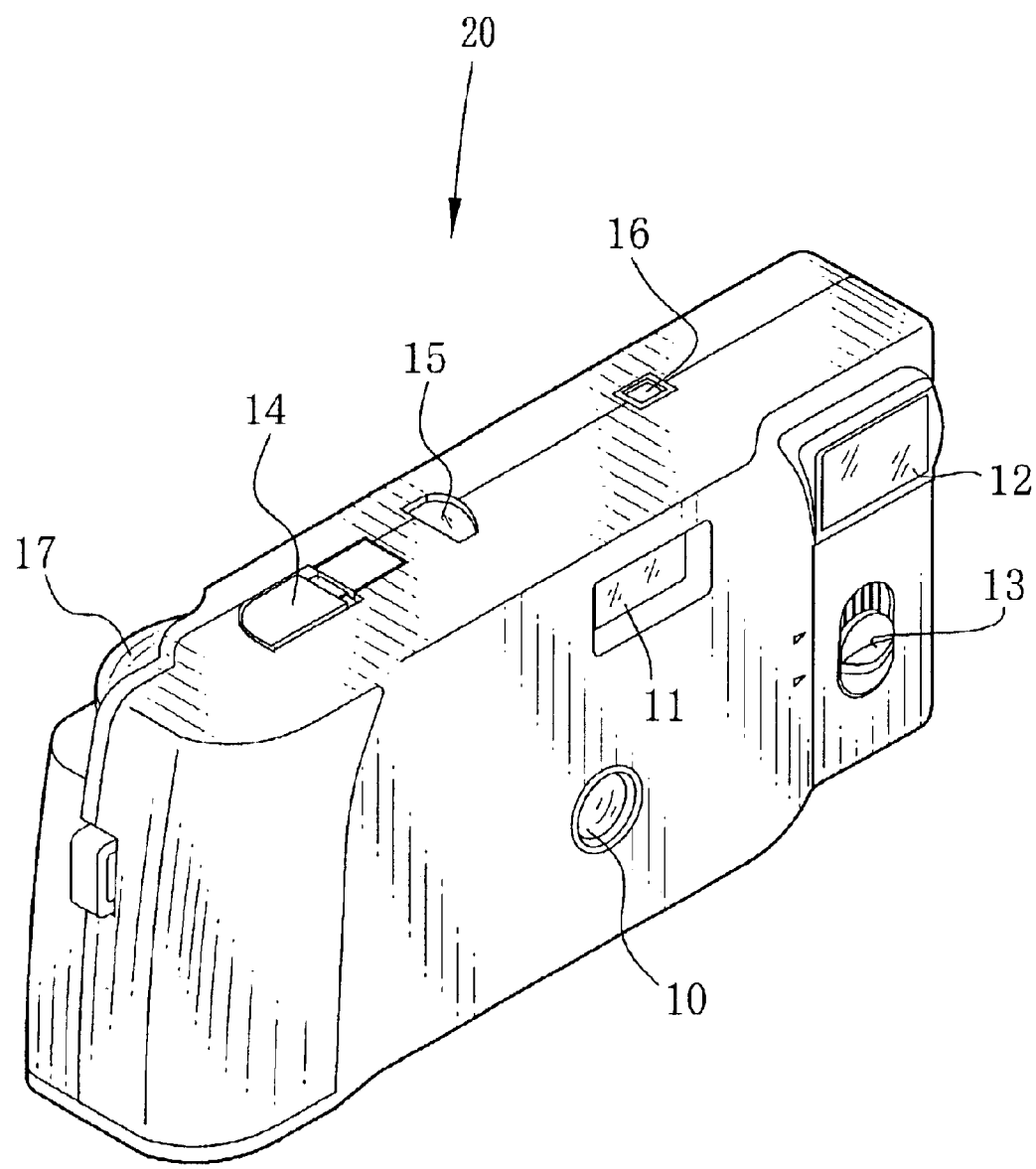
FIG. 1 is a front perspective view of a lens-fitted photo film unit which adopts a shutter device according to the present invention.

Referring to FIG. 1, there are a taking lens 10, a viewfinder objective window 11, a flash projector 12, and a flash charge switch 13 provided in a front side of a lens-fitted photo film unit 20. A top wall of the film unit 20 is provided with a shutter button 14, a counter window 15 for displaying the number of remaining picture frames, and a flash-ready indicator window 16. A winding dial 17 to rotate after each exposure and a viewfinder eyepiece window (not illustrated) are provided in a rear side of the film unit 20.

The flash charge switch 13, which is slidable up and down, is operated in flash photography. When the flash charging operation is completed, a light emission diode illuminates inside the film unit 20 so that a photographer recognizes light therefrom through the flash-ready indicator window 16. When the photographer presses the shutter button 14 after that, a flashlight is emitted from the flash projector 12 in synchronization with actuation of a shutter.

Figure 2:
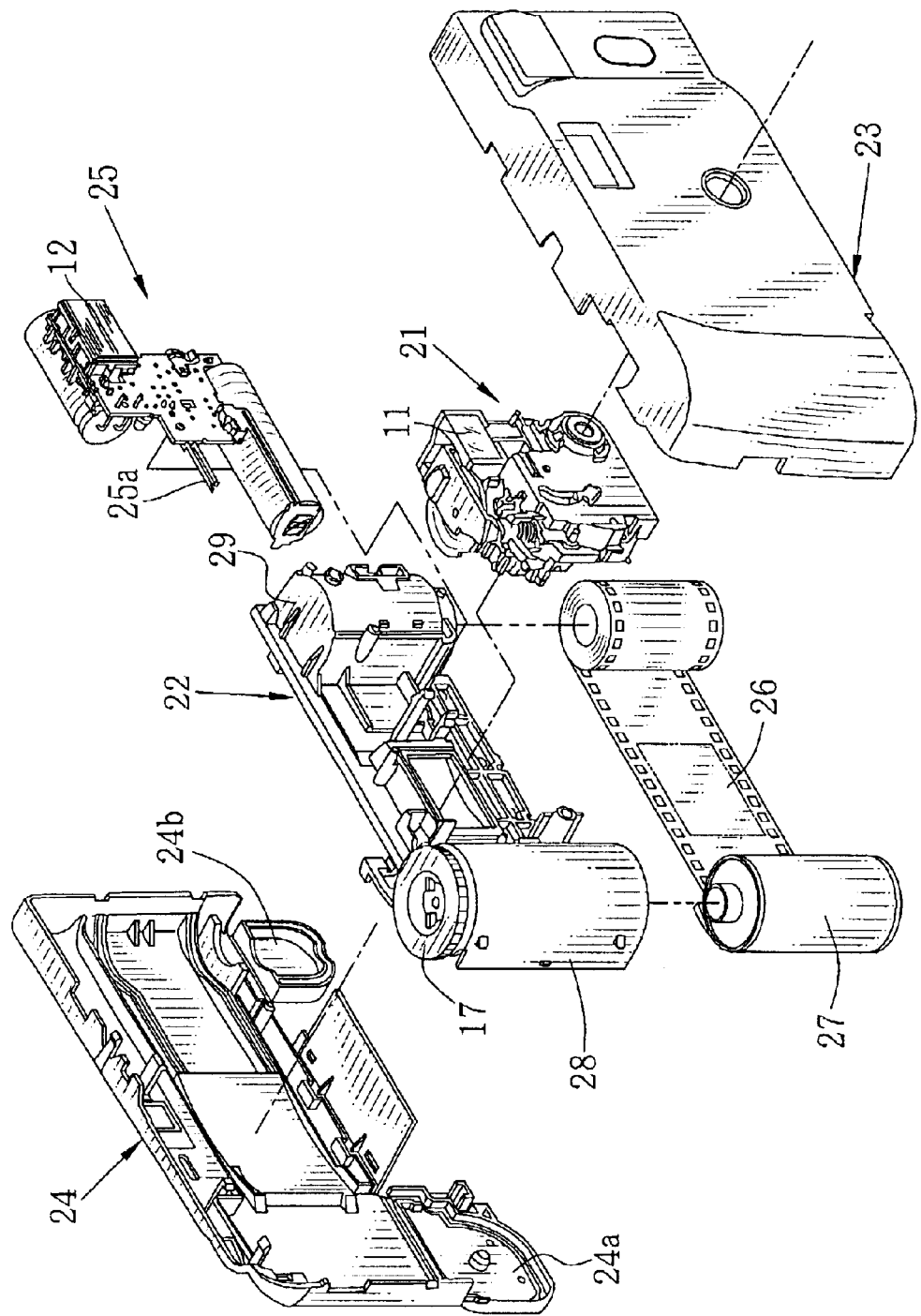
FIG. 2 is an exploded perspective view of the lens-fitted photo film unit of FIG. 1.

Referring to FIG. 2, the lens-fitted photo film unit 20 comprises a main body 22 in which an exposure apparatus 21 and the like are installed, a front cover 23, a rear cover 24, and a flash device 25. The front cover 23 has openings to expose the taking lens 10, the viewfinder objective window 11, the flash projector 12, and the flash charge switch 13 outside. The front cover 23 is fitted over the main body 22 to cover a front surface thereof.

A cassette chamber 28 and a film roll chamber 29 are integrally formed in the main body 22. The cassette chamber 28 contains a cassette 27 and the film roll chamber 29 contains a roll of photo filmstrip 26 drawn out of the cassette 27. The rear cover 24 includes bottom lids 24a and 24b. The bottom lids 24a and 24b close undersides of the cassette chamber 28 and the film roll chamber 29 in a light-tight fashion. The bottom lid 24a is opened when the cassette 27 containing the exposed photo filmstrip 26 is taken out.

The film-winding dial 17 is rotatably disposed on a top wall of the cassette chamber 28. An axis (not illustrated) integrally formed on a bottom surface of the film-winding dial 17 is fitted into a bearing of the cassette 27. When the film-winding dial 17 is turned in a counterclockwise direction, an exposed picture frame is wound up into the cassette chamber 28.

Figure 3:
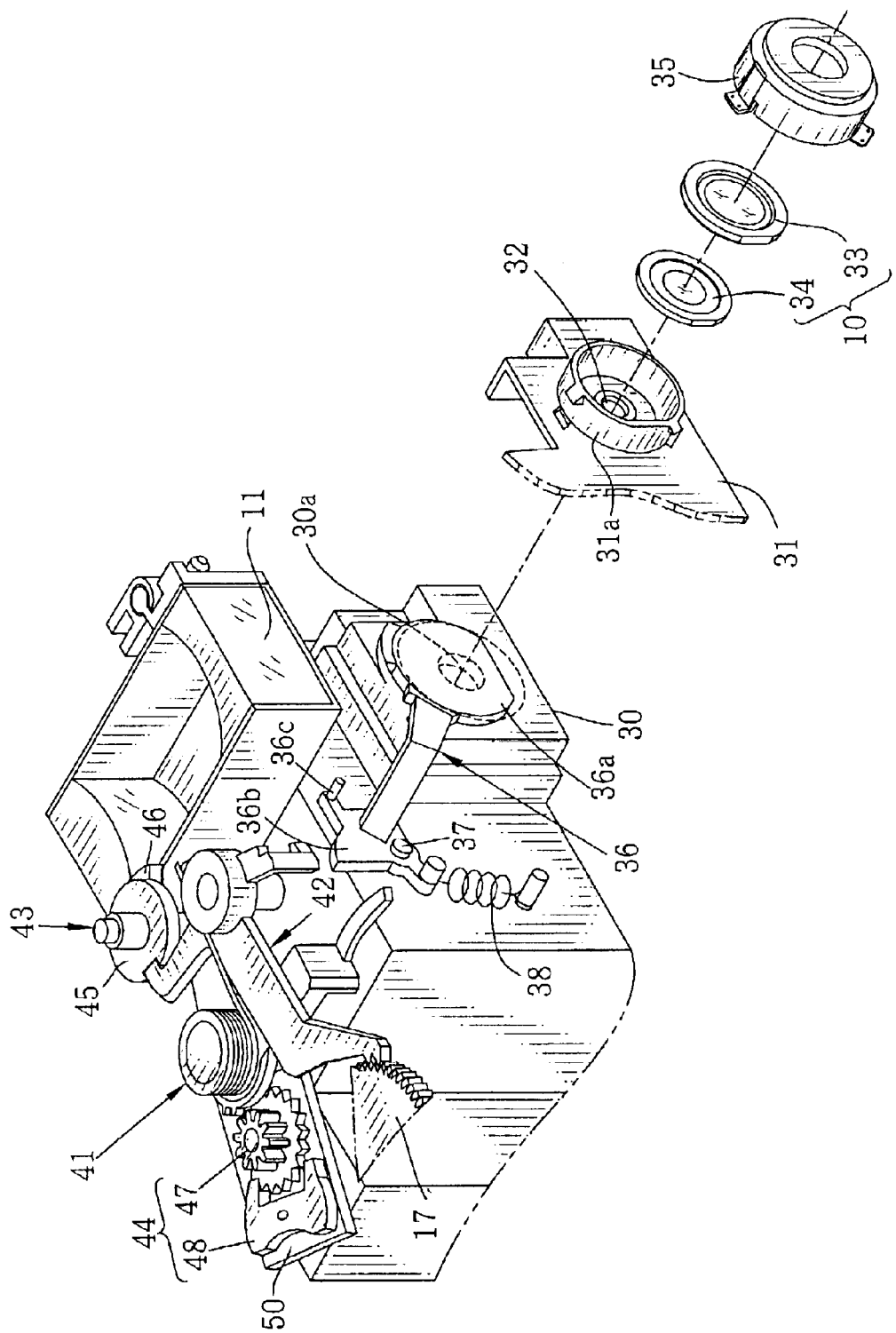
FIG. 3 is a partial cutaway exploded perspective view of an exposure apparatus.

The exposure apparatus 21 is installed in a nearly middle of the main body 22. The exposure apparatus 21 comprises an exposure tunnel 30 on which a shutter device, a film anti-winding device, a counter device for displaying the number of remaining picture frames, a viewfinder, and the like are installed. Referring to FIG. 3, an exposure opening 30a is formed in a front wall of the exposure tunnel 30. A lens holder 31 for holding the taking lens 10 is provided on the front wall of the exposure tunnel 30. The lens holder 31 has a lens barrel 31a in a center of which an opening 32 is formed to pass subject light to the exposure opening 30a.

The taking lens 10 is held inside the lens barrel 31a of the lens holder 31. The taking lens 10 is composed of a first lens element 33 and a second lens element 34. The first lens element 33 is a meniscus lens with a convex surface directed to an object, and the second lens element 34 is a double-convex lens. A lens cover 35 is fitted on a front of the lens barrel 31a. The lens cover 35 presses a peripheral area of the first lens element 33, so that the taking lens 10 is fixed between the lens holder 31 and the lens cover 35.

The shutter blade 36 is a sheet of sector blade rotatably attached to a pin 37 on the front wall of the exposure tunnel 30. The shutter blade 36 is usually held in a closed position, in which a blade section 36a lies over the exposure opening 30a to block outside light, by a bias of a spring 38. In photography, a shutter drive lever 41 moves in cooperation with a press of the shutter button 14 to strike an end of an attachment section 36b. So, the blade section 36a rotates in a clockwise direction in FIG. 3 and moves to an open position in which the exposure opening 30a is fully exposed. After that, the shutter blade 36 returns to the closed position by the bias of the spring 38. At the same time as the exposure opening 30a is exposed, a projection 36c of the shutter blade 36 turns on a synchro-switch 25a (refer to FIG. 2) provided in the flash device 25.

The shutter device is installed in an upper portion of the exposure apparatus 21. The shutter device comprises the shutter drive lever 41, a mooring lever 42, a cam 43, and a speed governor 44.

Figure 4:
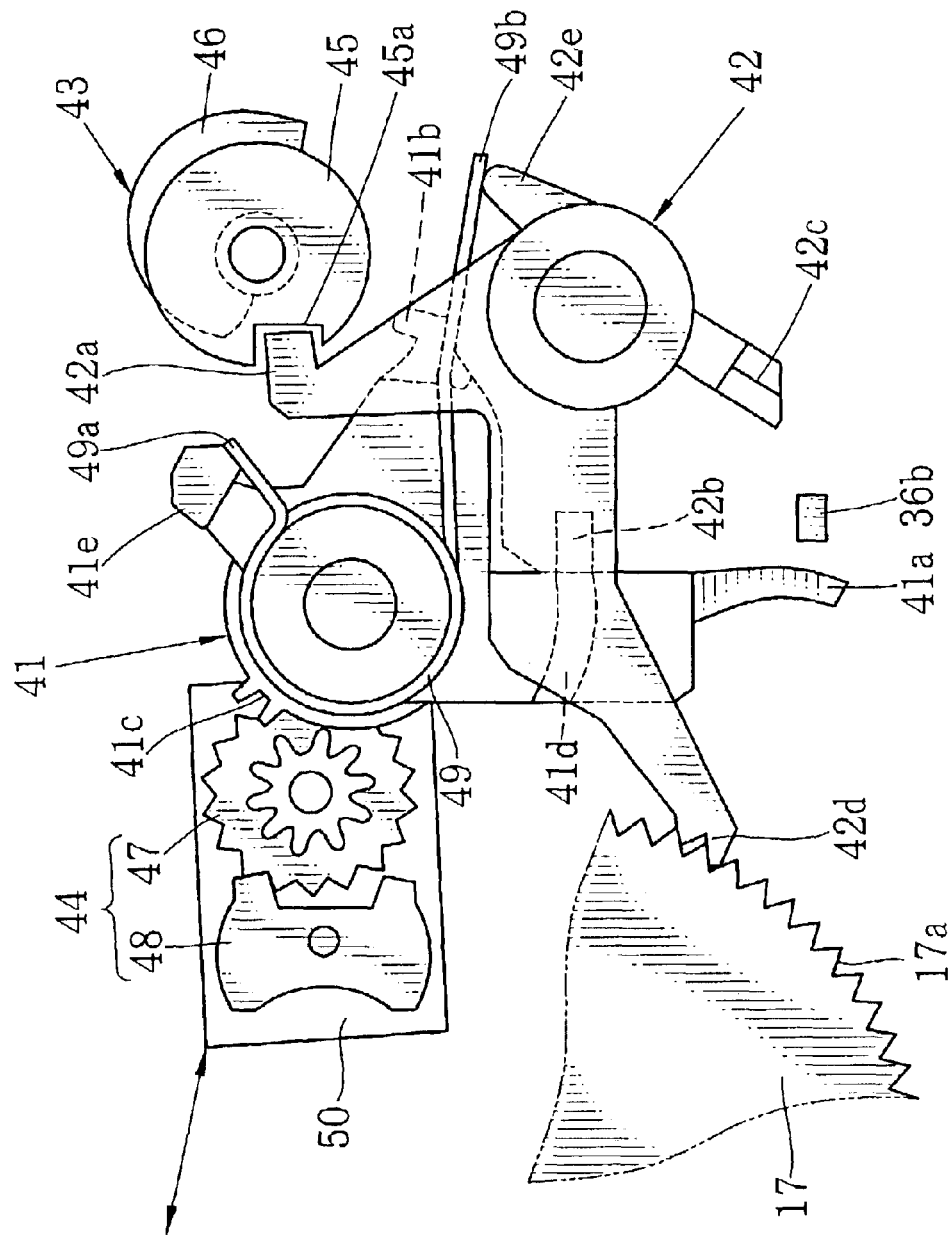
FIG. 4 is a plan view of a shutter device in which a shutter drive lever is in a charge position.

The shutter drive lever 41 is rotatably attached to a first pivot provided on a top wall of the exposure tunnel 30. The mooring lever 42 is rotatably attached to a second pivot provided on the top wall of the exposure tunnel 30. As shown in FIG. 4, since a bumper 41e of the shutter drive lever 41 is in contact with one end 49a of a torsion spring 49, the shutter drive lever 41 is urged toward a counterclockwise direction. A bumper 42e of the mooring lever 42 is in contact with the other end 49b of the torsion spring 49, so that the mooring lever 42 is urged toward a clockwise direction. When the shutter is charged, a second protrusion 42b formed on a bottom surface of the mooring lever 42 makes contact with a first protrusion 41d formed on a top surface of the shutter drive lever 41 in order to hold the shutter drive lever 41 in a charge position shown in FIG. 4.

The shutter drive lever 41 has a strike arm 41a for striking the attachment section 36b of the shutter blade 36, a hook 41b making contact with a semicircular plate 46 of the cam 43, and a shutter speed adjustment gear 41c engaged with an escapement wheel 47 of the speed governor 44. The shutter speed adjustment gear 41c is engaged with the escapement wheel 47, when the shutter drive lever 41 rotates to a position, between the closed position and the open position, in which the exposure opening 30a is fully open with striking the shutter blade 36.

The mooring lever 42 has a mooring claw 42a, a release portion 42c, and an anti-winding portion 42d. The mooring claw 42a is so designed as to get into a notch 45a of a circular plate 45. When the shutter drive lever 41 is in the charge position, the anti-winding portion 42d is engaged with gear teeth 17a formed in a periphery of the film winding dial 17 in order to lock the rotation of the film winding dial 17. Upon depression of the shutter button 14, the release portion 42c is pressed by a press part (not-illustrated) integrally formed underneath the shutter button 14, so that the mooring lever 42 rotates in the counterclockwise direction.

The cam 43 consists of the circular plate 45 and the semicircular plate 46 provided beneath the circular plate 45. The notch 45a is formed in the circular plate 45 to lock the mooring claw 42a of the mooring lever 42. As has been described above, the hook 41b of the shutter drive lever 41 makes contact with a periphery of the semicircular plate 46.

The speed governor 44 comprises an escapement wheel 47 having integrally formed two gear wheels, an anchor 48 with two claws, and a mounting board 50 on which the escapement wheel 47 and the anchor 48 are mounted. One gear wheel of the escapement wheel 47 is engaged with the claw of the anchor 48 in order to slow down a rotational speed of the escapement wheel 47. The other gear wheel is engaged with the shutter speed adjustment gear 41c. Thus, the rotational speed of the shutter drive lever 41 is decreased by the escapement wheel 47 and the anchor 48.

The mounting board 50 is movable in directions of an arrow in FIG. 4 in cooperation with movement of the flash charge switch 13. When the flash charge switch 13 is in an OFF position to stop the flash charging operation, the mounting board 50 is positioned in an evacuation position so that the escapement wheel 47 is not engaged with the shutter speed adjustment gear 41c. Or, for example, a selector switch may be provided in the cover of the film unit 20 to move the mounting board 50 to the evacuation position.

Figure 5:
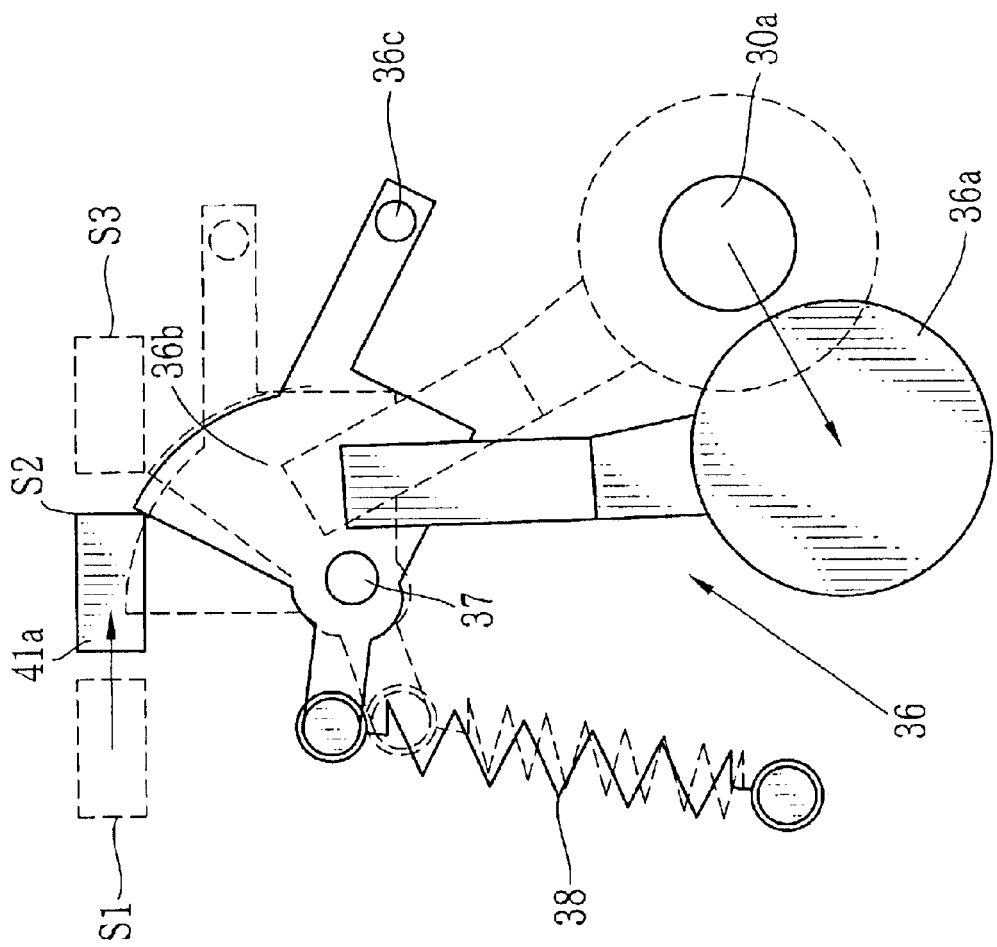
FIG. 5 is an explanatory view showing a positional relation between the shutter drive lever and a shutter blade when the shutter blade moves from a closed position to an open position.
Figure 6:
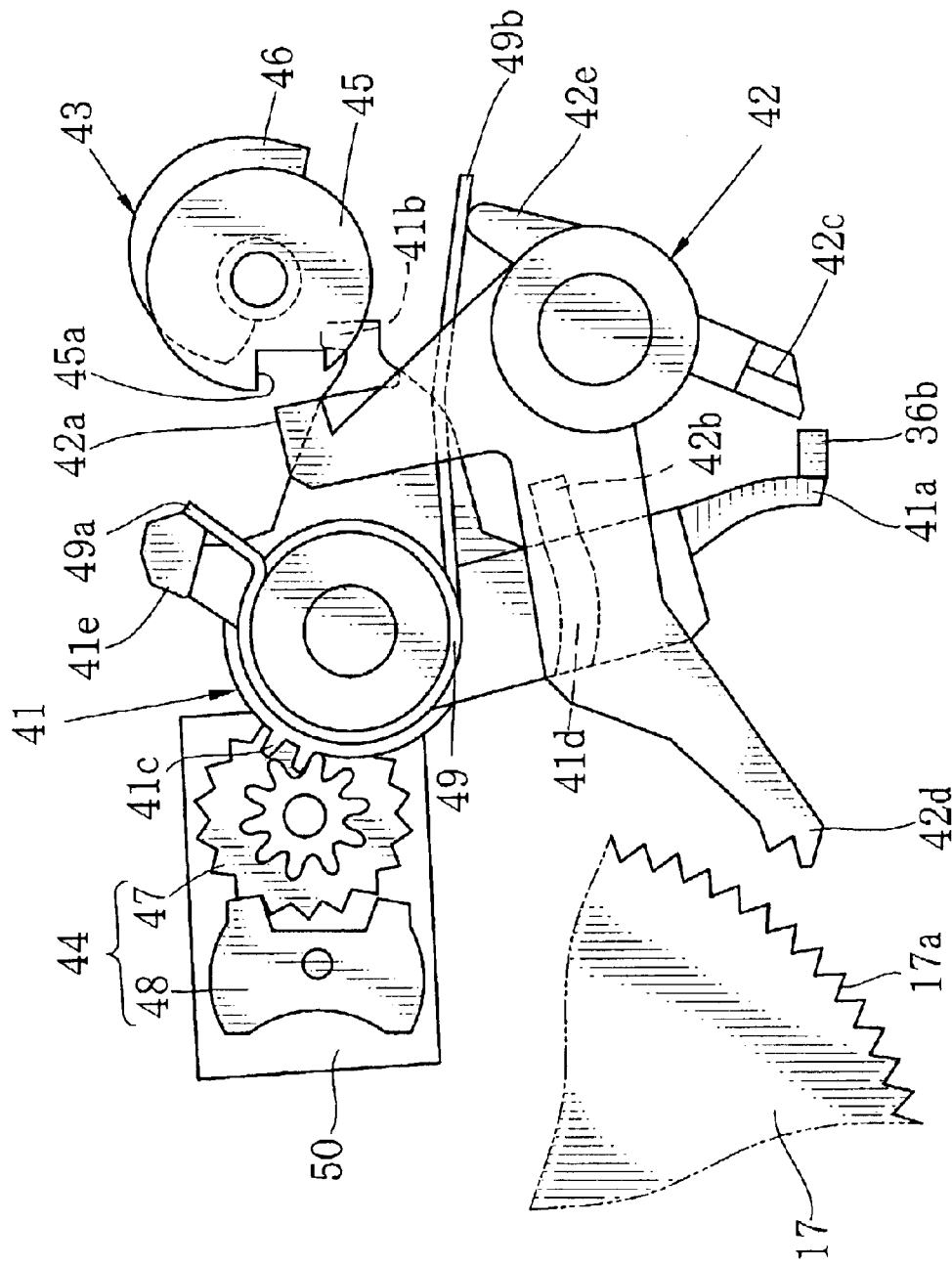
FIG. 6 is a plan view of the shutter device similar to FIG. 4, but in which the shutter drive lever is moving from the charge position to a release completion position.

FIGS. 5 and 6 show the shutter device when the shutter blade 36 rotates and fully exposes the exposure opening 30a. In FIG. 5, S1 to S3 represent positions of the strike arm 41a. S1 is the position when the shutter is charged, and S2 is the position when the strike arm 41a strikes the shutter blade 36 and fully exposes the exposure opening 30a. S3 shows the disengagement position where the strike arm 41a is disengaged with the shutter blade 36. When the strike arm 41a strikes the end of the attachment section 36b of the shutter blade 36, as shown in FIG. 5, the shutter blade 35 moves toward the open position, so that the exposure opening 30a is fully opened. Then, as shown in FIG. 6, the rotational speed of the shutter drive lever 41 becomes slow, due to engagement of shutter speed adjustment gear 41c with the escapement wheel 47 of the speed governor 44. The anchor 48 and the escapement wheel 47 properly adjust the rotational speed of the shutter drive lever 41.

Figure 7:
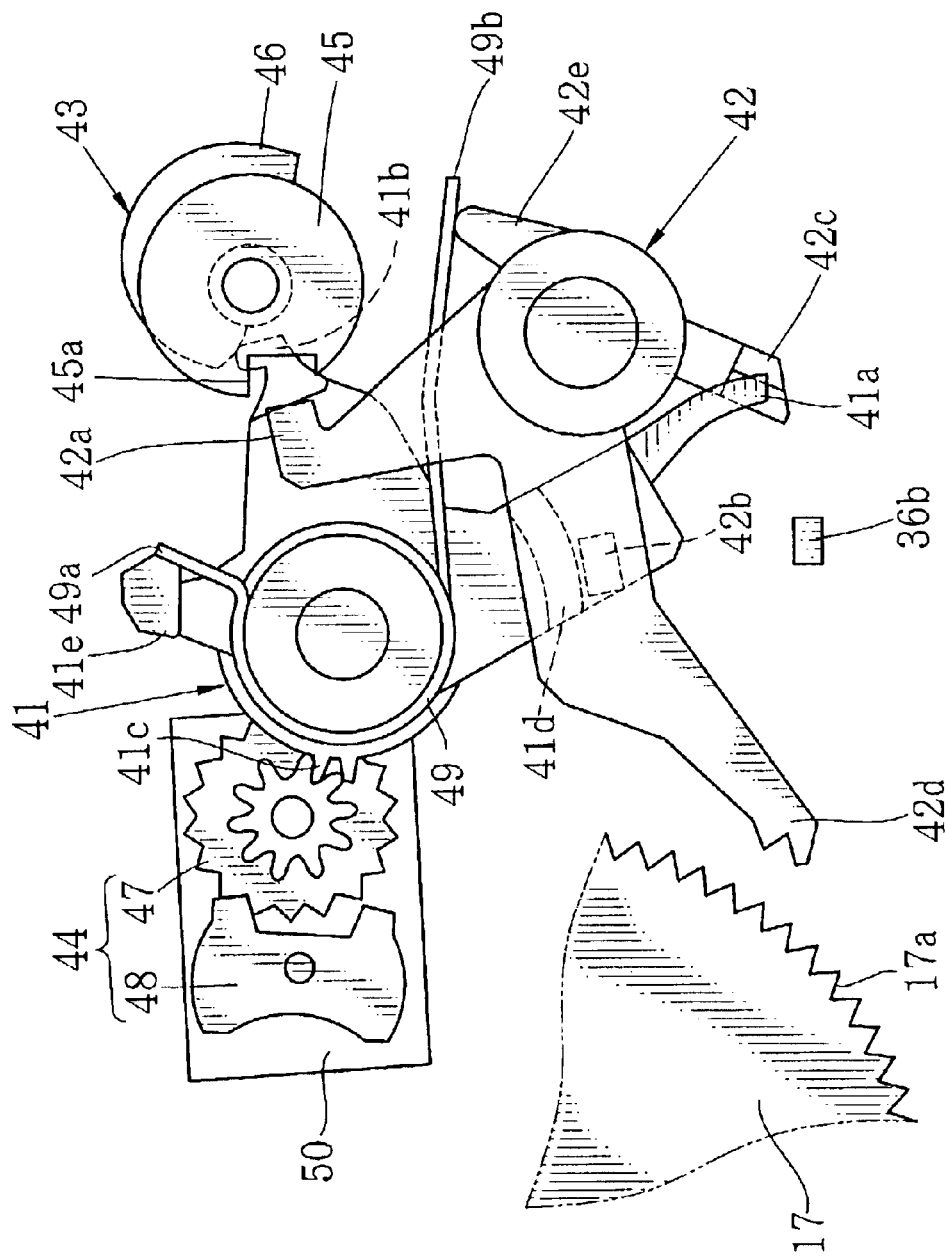
FIG. 7 is a plan view of the shutter device similar to FIG. 6, but in which the shutter drive lever is at the release completion position.

When being disengaged with the shutter drive lever 41, the shutter blade 36 returns to the closed position by the bias of the spring 38. The shutter drive lever 41 continues rotating until it reaches a release completion position shown in FIG. 7.

In a manner stated above, a single picture frame is exposed with the low shutter speed. In the above embodiment, the speed governor 44 adjusts the rotational speed of the shutter drive lever 41 until the strike arm 41a is disengaged with the attachment section 36b of the shutter blade 36. The mounting board 50 may be moved to the evacuation position during the engagement for the sake of stopping the adjustment of the rotational speed.

Operation of the present embodiment will now be described. When the mooring lever 42 rotates in cooperation with the press of the shutter button 14, the shutter drive lever 41 is moved from the charge position to the release completion position by the bias of the torsion spring 49. Then, since the strike arm 41a strikes the attachment section 36b, the shutter blade 36 rotates toward the open position and completely exposes the exposure opening 30a. At the same time, the shutter speed adjustment gear 41c is engaged with the escapement wheel 47 of the speed governor 44, so that the shutter drive lever 41 rotates at the low rotational speed. Until the strike arm 41a is disengaged with the attachment section 36b, the exposure opening 30a is held fully open. The single picture frame of the photo filmstrip 26 is exposed with the low shutter speed in such a manner. When the strike arm 41a moves to the disengagement position, the shutter blade 36 returns to the closed position by the bias of the spring 38. The shutter drive lever 41 continues rotating, and then reaches the release completion position. In such a manner, one exposure is made with the low shutter speed.

In the above embodiment, it is possible to have the desired shutter speed because the anchor 48 controls the rotational speed of the escapement wheel 47. In the above embodiment, the shutter speed adjustment gear 41c has two gear teeth, but the number of gear tooth/teeth may be one or three.

Instead of the speed governor with the escapement wheel 47 and the anchor 48 like the above embodiment, a leaf spring 61 may be available as shown in FIG. 8. In this case, a ledge 62c touches and presses an end portion 61a of the leaf spring 61 during the rotation of the shutter drive lever 62. Friction produced between the ledge 62c and the end portion 61a slows down the rotational speed of the shutter drive lever 62.

Although the present invention has been described with respect to the preferred embodiments, the present invention is not to be limited to the above embodiments but, on the contrary, various modifications will be possible to those skilled in the art without departing from the scope of claims appended hereto.

What is claimed is:

1. A shutter device of a lens-fitted photo film unit having a shutter blade held in a position to cover an exposure opening by a bias of a spring, said shutter device comprising:
   a shutter drive lever for striking said shutter blade against said bias of said spring to expose said exposure opening;
   a speed governor for slowing down a shutter speed by acting on said shutter drive lever;
   wherein the speed governor, the shutter blade, and the shutter drive lever are arranged so that when the shutter drive lever is released for said exposure, the shutter drive lever initially travels at a speed unrestricted by the speed governor until the shutter blade is moved to a position in which the exposure opening is entirely exposed, and only after the exposure opening is entirely exposed is movement of the shutter drive lever slowed by the speed governor.

2. A shutter device as recited in claim 1, wherein said shutter drive lever has a shutter speed adjustment portion, and said speed governor has a speed governing member, and said exposure opening is held fully open while said shutter speed adjustment portion and said speed governing member make contact with each other.

3. A shutter device as recited in claim 2, wherein said speed governor is movable between a first position in which said speed governing member is in contact with said shutter speed adjustment portion to slow down said shutter speed, and a second position in which said speed governing member is away from a moving area of said shutter speed adjustment portion.

4. A shutter device as recited in claim 3, wherein said shutter drive lever is rotatably attached, and said speed governor slows down said shutter speed by means of slowing down rotational speed of said shutter drive lever.

5. A shutter device as recited in claim 4, wherein said shutter speed adjustment portion is a shutter speed adjustment gear formed in a periphery of said shutter drive lever.

6. A shutter device as recited in claim 5, wherein said speed governing member is an escapement wheel with an integrally formed first gear wheel and second gear wheel, and said speed governor further comprises:
   a swingable anchor having a claw engaged with said first gear wheel;
   a movable attachment plate on which said escapement wheel and said anchor are mounted, said speed governor being movable between said first position and said second position in accordance with movement of said attachment plate, and when said speed governor being in said first position, said escapement wheel rotating in such a condition that said second gear wheel is engaged with said shutter speed adjustment gear, so that the rotational speed of said shutter drive lever becomes slow due to an engagement between said first gear wheel and said anchor.

7. A shutter device as recited in claim 4, wherein said shutter speed adjustment portion is a ledge formed in a periphery of said shutter drive lever.

8. A shutter device as recited in claim 7, wherein said speed governor is a leaf spring having said speed governing member at an end portion thereof, and the rotational speed of said shutter drive lever becomes slow while said speed governing member is in touch with said ledge.

* * * * *